(12) United States Patent
Ziegler et al.

(10) Patent No.: US 8,726,694 B2
(45) Date of Patent: May 20, 2014

(54) METHOD AND APPARATUS FOR MANUFACTURING GLASS TUBES HAVING A PREDETERMINED INNER PROFILE, PREFERABLY FOR CONTINUOUSLY MANUFACTURING SUCH GLASS TUBES

(75) Inventors: Michael Ziegler, Mitterteich (DE); Rainer Eichholz, Frankfurt am Main (DE); Erhard Zemsch, Mitterteich (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 13/551,920

(22) Filed: Jul. 18, 2012

(65) Prior Publication Data

US 2013/0186143 A1 Jul. 25, 2013

(30) Foreign Application Priority Data

Jul. 22, 2011 (DE) .......................... 10 2011 052 067

(51) Int. Cl.
*C03B 17/04* (2006.01)
*C03B 33/06* (2006.01)

(52) U.S. Cl.
CPC ................. *C03B 17/04* (2013.01); *C03B 33/06* (2013.01)
USPC ..................................... 65/87; 65/86; 65/187

(58) Field of Classification Search
CPC ............ C03B 17/04; C03B 7/12; C03B 33/06
USPC ................................................ 65/86, 87, 439
See application file for complete search history.

(56) References Cited

U.S. PATENT DOCUMENTS

| 2,009,793 | A | 7/1935 | Sanchez-Vello |
| 2,765,586 | A | 10/1956 | Wilson |
| 3,035,371 | A | 5/1962 | Mouly et al. |
| 3,063,268 | A | 11/1962 | Knisely |

(Continued)

FOREIGN PATENT DOCUMENTS

| DD | 254 380 | 2/1988 |
| DE | 497 649 | 5/1930 |

(Continued)

OTHER PUBLICATIONS

Conturax Pro, Technical Data, Schott AG, Business Segment Tubing, Jan. 2010.

*Primary Examiner* — Matthew Daniels
*Assistant Examiner* — Cynthia Szewczyk
(74) *Attorney, Agent, or Firm* — Michael J. Striker

(57) ABSTRACT

The method produces glass tubes having a predetermined inner profile according to a Vello-method or Down-Draw method, wherein molten glass emerges from an outlet orifice of a melt feed and is drawn over a shaping body to form a hollow drawing bulb, and the drawing bulb is drawn over a profile forming body downstream of the shaping body to form the predetermined inner profile. To enable a reliable, risk-free positioning of the profile forming body within the drawing bulb, the profile forming body is axially moved either from below the shaping body via an inner space of the glass tube or via an inner bore of a shaft supporting the shaping body until reaching an operational position in the inner space of the glass tube. An apparatus for performing the method is also described.

13 Claims, 7 Drawing Sheets

(56) References Cited

U.S. PATENT DOCUMENTS

| | | | |
|---|---|---|---|
| 3,190,739 A * | 6/1965 | Wilson | 65/85 |
| 3,230,060 A | 1/1966 | Lippmann | |
| 3,269,821 A | 8/1966 | Vatterodt | |
| 3,298,808 A | 1/1967 | Macks | |
| 3,410,675 A | 11/1968 | Dockerty | |
| 3,607,184 A | 9/1971 | Williams | |
| 3,764,286 A | 10/1973 | Antczake et al. | |
| 4,228,206 A | 10/1980 | Fabisak | |
| 4,247,320 A | 1/1981 | Bansal et al. | |
| 4,525,194 A | 6/1985 | Rudoi | |
| 4,717,607 A | 1/1988 | Pfizenmaier et al. | |
| 4,941,904 A | 7/1990 | Barch et al. | |
| 5,080,705 A | 1/1992 | Ott et al. | |
| 2001/0055930 A1 | 12/2001 | Ott et al. | |
| 2004/0018164 A1 | 6/2004 | Boeck et al. | |
| 2005/0092030 A1 | 5/2005 | Balakrishnan et al. | |
| 2005/0227027 A1 | 10/2005 | Maenner et al. | |
| 2006/0260360 A1 | 11/2006 | Dick et al. | |
| 2009/0047454 A1 | 2/2009 | Maenner et al. | |
| 2009/0064715 A1 | 3/2009 | Horn et al. | |

FOREIGN PATENT DOCUMENTS

| | | |
|---|---|---|
| DE | 2 217 725 | 8/1974 |
| DE | 100 16 108 | 10/2001 |
| DE | 10 2004 018 148 | 11/2005 |
| DE | 10 2008 006 015 | 7/2009 |
| FR | 38 432 | 6/1931 |
| JP | 60-36339 | 2/1985 |
| JP | 9-315831 | 12/1997 |
| JP | 2005-298326 | 10/2005 |
| JP | 2009-529483 | 8/2009 |
| SU | 715511 | 2/1980 |
| SU | 837943 | 6/1981 |

* cited by examiner

METHOD AND APPARATUS FOR MANUFACTURING GLASS TUBES HAVING A PREDETERMINED INNER PROFILE, PREFERABLY FOR CONTINUOUSLY MANUFACTURING SUCH GLASS TUBES

CROSS-REFERENCE

The present application claims priority of German patent application no. 10 2011 052 067.8, "METHOD AND APPARATUS FOR MANUFACTURING GLASS TUBES HAVING A PREDETERMINED INNER PROFILE, PREFERABLY FOR CONTINUOUSLY MANUFACTURING SUCH GLASS TUBES", filed on Jul. 22, 2011, the whole content of which is hereby incorporated by reference.

FIELD OF INVENTION

The present invention relates to a method and apparatus for continuously manufacturing calibrated round or profiled glass tubes, especially calibrated round or profiled glass tubes having a predetermined inner profile and/or a pre-determined outer profile.

BACKGROUND OF INVENTION

Glass tubes of the aforesaid type, having lengths of up to several meters are required as starting material for manufacturing a wide range of glass elements, for example, for manufacturing bottles and containers, tubular covers for illuminants and for manufacturing illuminant tubes in lighting engineering. On the one hand, it is required that these glass tubes should be produced as cheaply as possible. On the other hand, in many applications, for example in lighting engineering, there is a demand for glass tubes having precisely finished inner profiles, for example, predetermined by the technical specifications in the respective application.

In the manufacture of glass tubes, a fundamental distinction is made between discontinuous and continuous manufacturing methods. Because of the fundamentally different process parameters in most cases, the principles applied in discontinuous manufacturing methods cannot or at least cannot easily be transferred to continuous manufacturing methods so that they cannot serve as a stimulus for the person skilled in the art to improve continuous manufacturing methods.

DE 497 649 discloses a method and apparatus for drawing glass tubes having round or non-round inner profiles using the so-called Danner method. In this method liquid glass is externally guided onto an inclined, rotating tubular body and drawn off as a tube at its lower end. In this method the inner profile of the drawn glass tube is defined by the outer profile of the tubular body at its lower end. In order to produce glass tubes having a non-round inner profile, the lower end of the tubular body can also have an outer contour which deviates from a circular shape. The inner profile of the glass tubes thus produced has comparatively high tolerances. The edge radii of glass tubes having non-round profiles are also comparatively large. Thus, this method frequently no longer meets the present requirements for the precision and tolerances of calibrated round or profiled glass tubes.

U.S. Pat. No. 2,009,793, the whole content of which is hereby incorporated, discloses the so-called Vello method for continuously manufacturing glass tubes having a circular inner profile. A substantially cone-shaped shaping body is arranged underneath an outlet opening of a melt channel, which serves as a receptacle for the molten glass, concentrically to the nutlet member of the melt channel. The emerging molten glass is drawn out by a drawing device through the annular gap between the shaping body and the outlet member so that a glass tube having a circular inner profile substantially predetermined by the outer contour of the shaping body is formed. Downstream from the shaping body the still deformable, tubular glass body is further stretched by means of a drawing device until this has finally cooled below the softening point. The inside diameter and the wall thickness of the glass tube is determined by the dimensions of the annular gap between the shaping body and the outlet member of the melt channel, by the temperature of the emerging molten glass, the temperature relationships downstream of the outlet opening and by the tensile force or drawing speed of the drawing device. It is relatively difficult to find suitable ranges of parameters for manufacturing glass tubes having different profiles and requires a great deal of experience which at least makes it expensive to completely automate the method. Re-equipping the melting furnace to manufacture glass tubes having different profiles is relatively expensive. Nevertheless, glass tubes manufactured by the Vello method have tolerances which increasingly are no longer suitable for the present applications.

FIG. 1a shows in a schematic sectional view an apparatus for manufacturing calibrated round or profiled glass tubes according to German patent DE 10 2004 018 148 B4 or corresponding US 2005/0227027 A1 of the applicant, the whole content of which is hereby incorporated. It comprises a shaping body 103 embodied as a drawing needle and a downstream profile forming body 104, which can be shifted in axial direction, for forming the inner profile of glass tube 105. While FIG. 1a shows the apparatus 100 in a position where the profile forming body 100 almost abuts against the shaping body, FIG. 1b shows this apparatus 100 in a position where the profile forming body 104 is arranged at a distance from the shaping body 103. In this apparatus 100 the shaping of the hot but still deformable drawing bulb 150 and the further shaping thereof to a calibrated round or profiled glass tube 105 can be accomplished in different zones, so that the process parameters of the drawing method can be set in a variable but controlled manner. The profile forming body can also be replaced by a different suitable profile forming body for varying the inner profile of the glass tube 105 to be manufactured.

For replacement of the profile forming body 104 by a different profile forming body firstly the flow of the glass melt 107 via the outlet ring 24 is stopped by lifting the shaping body 103 and closing the outlet orifice 112 of the melt channel 102. Then the profile forming body 104 is released from the rod 132 and a new profile forming body 104 is coupled with the rod 132 or the rod 132 is completely replaced together with the profile forming body 104. Subsequently, the outlet orifice 112 of the melt channel 102 is again opened to a sufficient extent by lowering the shaping body 103 and then the process is started again. The glass melt 106 is drawn over the shaping body 103 with a predetermined drawing speed. Then the level of the profile forming body 104 is varied suitably by axial displacement of the rod 132 until suitable parameters for the position of the profile forming body 104 relative to the shaping body 103, for the temperature and for the drawing speed have been found to thereby form a glass tube 105 having a predetermined inner profile. By means of the temperature, the drawing speed, the throughput and the position of the shaping body 103 in particular the wall thickness of the glass tube 105 can be varied.

For placing the profile forming body in this process firstly the flow of the glass melt needs to be stopped by means of the shaping body. Often this results in jamming of the outlet orifice 124 with glass and hence later in failures and/or batches of lower quality caused by glass dripping down along the outer surface of the glass tube. Furthermore, the above procedure for replacement of the profile forming body also bears a substantial accident hazard because the apparatus needs to be handled in the region near the outlet orifice 112 where there always exists the risk of a sudden discharge of glass melt.

SUMMARY OF INVENTION

It is an object of the present invention, based on DE 10 2004 018 148 B4 or corresponding US 2005/0227027 A1 of the applicant, to provide an enhanced method for the preferably continuous manufacturing of glass tubes having a predetermined inner profile, wherein the profile forming body can be adjusted in the operational position in a simple but reliable manner. According to a further aspect of the present invention an apparatus for the preferably continuous manufacturing of glass tubes is to be provided.

According to the present invention, the above problems are solved by a method and apparatus having the features of claims 1 and 11, respectively. Further advantageous embodiments are the subject-matter of the dependent claims.

Based on process according to DE 10 2004 018 148 B4 or corresponding US 2005/0227027 A1 of the applicant, wherein the profile forming body disposed downstream of the shaping body is held concentrically to the shaping body and preferably spaced apart from the shaping body and wherein the distance between the shaping body and the profile forming body preferably can be varied during the process, e..g in order to vary the wall thickness of the glass tube, according to the present invention a procedure is carried out in order to position the profile forming body more reliably and more secure in the operational position.

For this purpose, according to a first embodiment the profile forming body is inserted into the inner space of the glass tube from below the shaping body and via the inner space of the glass tube and displaced in axial direction until reaching the desired operational position. This procedure can be carried out in particular from a bottom or bottom space below the outlet orifice, which is at a sufficient distance to the outlet orifice so that the profile forming body can be positioned here in advance, in particular in alignment and concentrically with the inner profile of the glass tube being manufactured. For inserting the profile forming body into the inner space of the glass tube being manufactured and for suitably positioning the profile forming body, a cutting device may be disposed in the region below the drawing bulb, where the glass tube being manufactured has already cooled down sufficiently, for severing (cutting) the glass tube in this region to thereby provide a region with free access below the shaping body, e.g. above the afore-mentioned bottom. Now, the profile forming body can be positioned in a suitable manner on the bottom. Afterwards, the profile forming body can be inserted into the inner space of the glass tube, which is continuously drawn, up to the region of the drawing bulb and can be positioned at a suitable distance to the shaping body to thereby become positioned at a suitable operational position. In order to enable an easy inserting of the profile forming body into the inner space of the glass tube, preferably the glass tube is widened before inserting the profile forming body, e.g. by applying a negative pressure from the outside of the drawing bulb and/or of the still plastic and deformable glass tube line, by a suitable adjustment of the process parameters, in particular of the drawing-off rate or comparable measures.

This positioning and insertion can be performed without risk from outside of the production area and can be controlled so that the accident risk is minimized in the process according to the invention. Furthermore, it is not necessary to interrupt the feed of molten glass, because it is possible to set (put) and/or replace the profile forming body during a running production process. Glass tubes that do not have a suitable inner profile but have been produced while setting (putting) and/or replacing the profile forming body, can be rejected or sorted out simply by cutting out such portions. Thus, the manufacturing process is basically not interrupted so that a tedious and complicated process for again running-up of the process plant can be reliably prevented, in particular an undesired dripping down of glass droplets at the outer surface of the glass tube.

For raising the profile forming body, a rod or cable can be lowered via an inner bore of a shaft supporting the shaping body until reaching the pre-positioned profile forming body, can then be coupled with the profile forming body and afterwards can be raised again until reaching the desired operational position. Of course, as an alternative a rod can also lift the profile forming body from below, e.g. from the bottom floor of the process plant, until the profile forming body reached the desired operational position.

According to a further embodiment the width of the inner bore of the shaft supporting the shaping body is sufficient so that the profile forming body can also be inserted from above and via the inner bore into the inner space of the drawing bulb and of the glass tube until reaching the desired operational position. In this embodiment the profile forming body can also be coupled with the rod permanently; however, it is preferred if the profile forming body is releasably coupled with the rod. Preferably, the rod is configured for holding the profile forming body stably in the operational position. The afore-mentioned cable or the chain can be used as auxiliary means for raising the profile forming body up to the rod, serving as a supporting means, e.g. from the bottom floor of the process plant far below the shaping body.

In order to enable an even more reliable insertion of the profile forming body into the inner space of the glass tube, according to a further embodiment the profile forming body is guided or held centered or in alignment with the inner space of the glass tube, in particular until the profile forming body has reached the front end of the glass tube line being drawn. For this purpose a support or guiding device for suitably holding or guiding the profile forming body may be provided, preferably a support or guiding device which is centered or can be centered in a suitable manner. Furthermore, for this purpose also a straight-guided guiding device may be disposed in the inner bore of the shaft supporting the shaping body, which guides the rod or cable with an acceptable lateral play so that the rod or cable is guided basically only in axial direction and concentric to the middle axis of the glass tube being drawn.

The above procedure is suited not only for disposing the profile forming body in the desired operational position for the first time, but also for replacing a profile forming body currently used by another profile forming body having a different outer profile and during a running production of glass tubes.

In order to ensure that the currently used profile forming body is reliably guided outside of the inner space of the glass tube and/or that a new profile forming body to be used is reliably guided into the inner space of the glass tube, according to a further embodiment the glass tube and/or said drawing bulb is widened until a minimum inner dimension of the glass tube transverse to the direction of drawing-off the glass tube (or the minimum opening width of the glass tube) is larger than a maximum outer dimension of the profile forming body transverse to the direction of drawing-off of the glass tube, so that it can be inserted into the inner space of the glass tube and/or the drawing bulb substantially without contact. For widening the glass tube currently produced, the process parameters of the process can be varied in a suitable manner, in particular the drawing rate and the opening width of the outlet orifice of the melt feed, possibly also other parameters, in particular the temperature near a heating muffle surrounding the drawing bulb.

According to a further embodiment, also a negative pressure can be generated in the region of the drawing bulb from an outer side of the glass tube or drawing bulb while said glass tube is widened, namely preferably within a heating muffle which is disposed directly downstream from the outlet orifice and surrounds the drawing bulb for setting suitable temperatures.

According to a further embodiment the profile forming body is held or guided rotationally fixed relative to the shaping body and the outlet orifice of the melt fee so that no relative rotation between the profile forming body and the glass tube being manufactured occurs. This ensures in particular in the case of non-circular inner profiles of the glass tube a reliable positioning of the profile forming body in the desired operational position.

According to a further embodiment, in the operational position at least two counter members are disposed around the profile forming body spaced apart thereto while forming a gap so that also the outer profile of the glass tube can be shaped or calibrated. In this manner according to the invention glass tubes having a predetermined inner profile and outer profile can be produced. For this purpose, the counter members are positioned preferably symmetrically around the profile forming body, in particular in a mirror-symmetric or point-symmetric configuration with respect to a centre axis of the profile forming body. Besides a reliable forming of the outer profile such a positioning of the counter members of the profile forming body also enhances the stability of the operational position of the profile forming body in view of an accidental displacement in a direction perpendicular to the direction of drawing-off the glass tube.

A further aspect of the present invention relates to an apparatus or process plant configured for carrying-out the aforementioned process for producing glass tubes having a predetermined inner profile, preferably in a continuous process. For this purpose a correspondingly configured control device is provided, which controls the process for producing the glass tube.

BRIEF DESCRIPTION OF THE DRAWINGS

In the following the invention will be described in an exemplary fashion and with reference to the appended drawings, from which further features, advantages and problems to be solved may be deduced and wherein.

Throughout the figures identical reference numbers denote identical or substantially equivalent elements or groups of elements.

DETAILED DESCRIPTION OF THE INVENTION

Figure 1A:
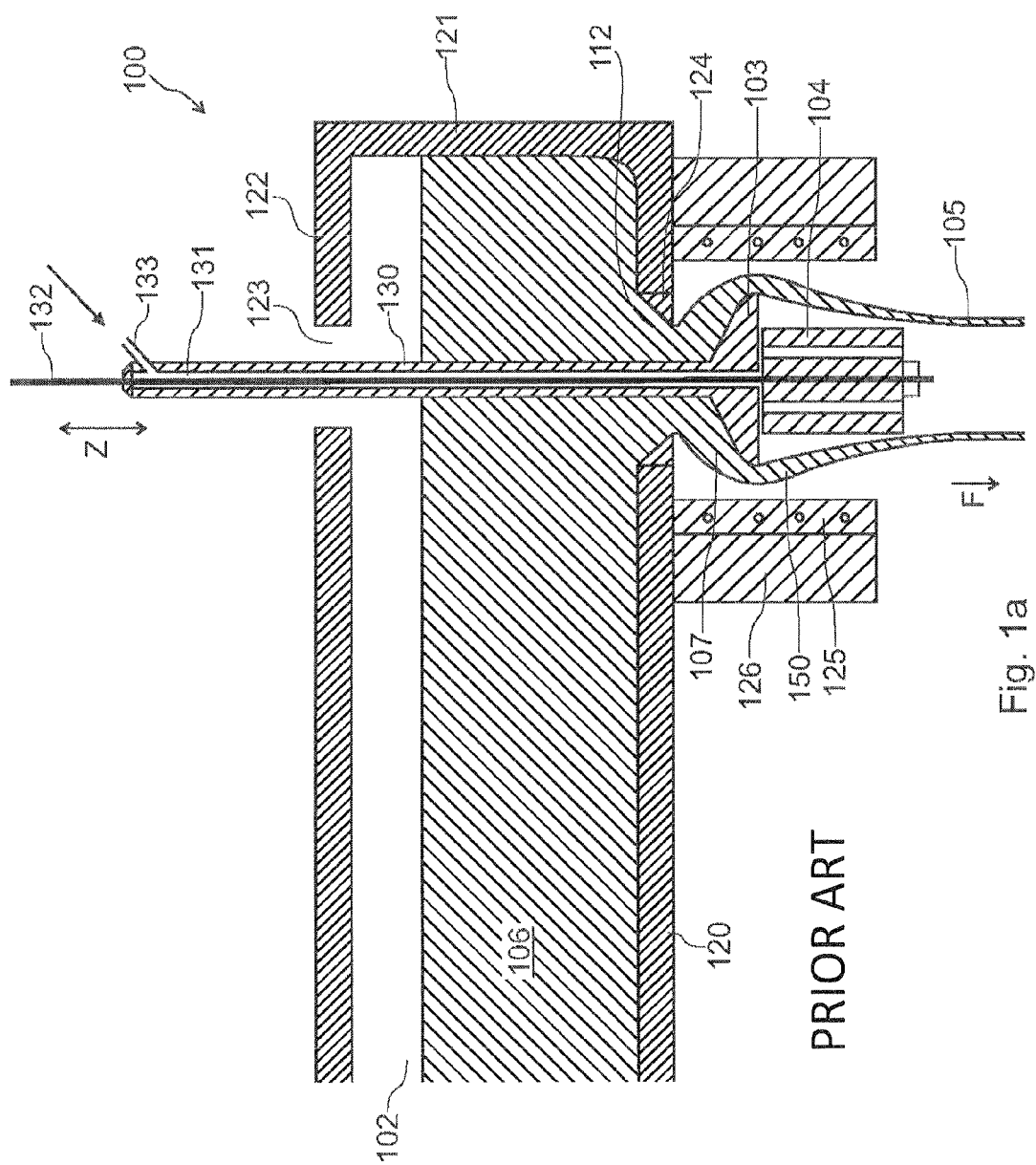
FIGS. 1a and 1b are schematic sectional views showing an apparatus for manufacturing calibrated round or profiled glass tubes according to the present invention in two different positions of the profile forming body.
Figure 1B:
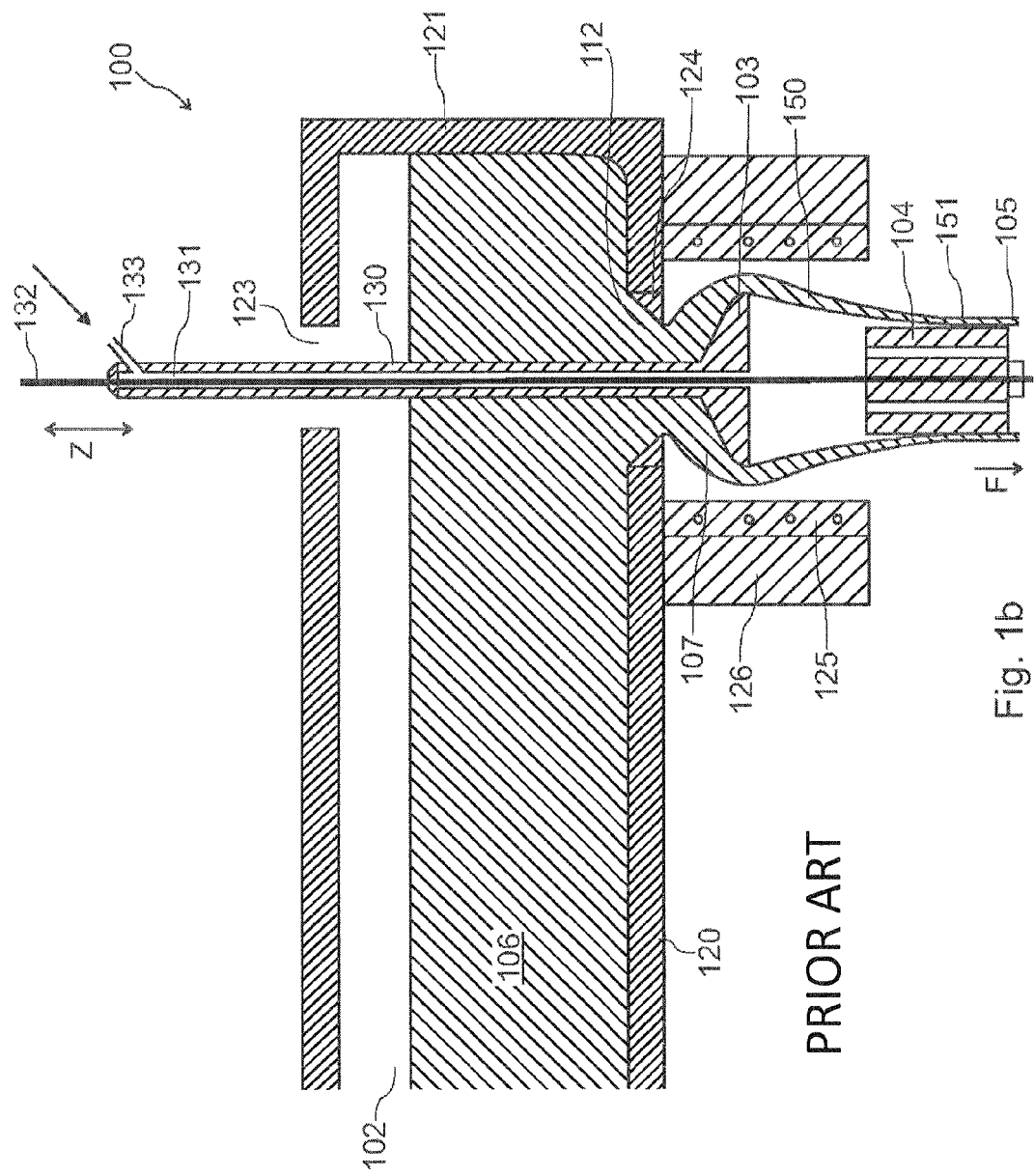
Figure 2:
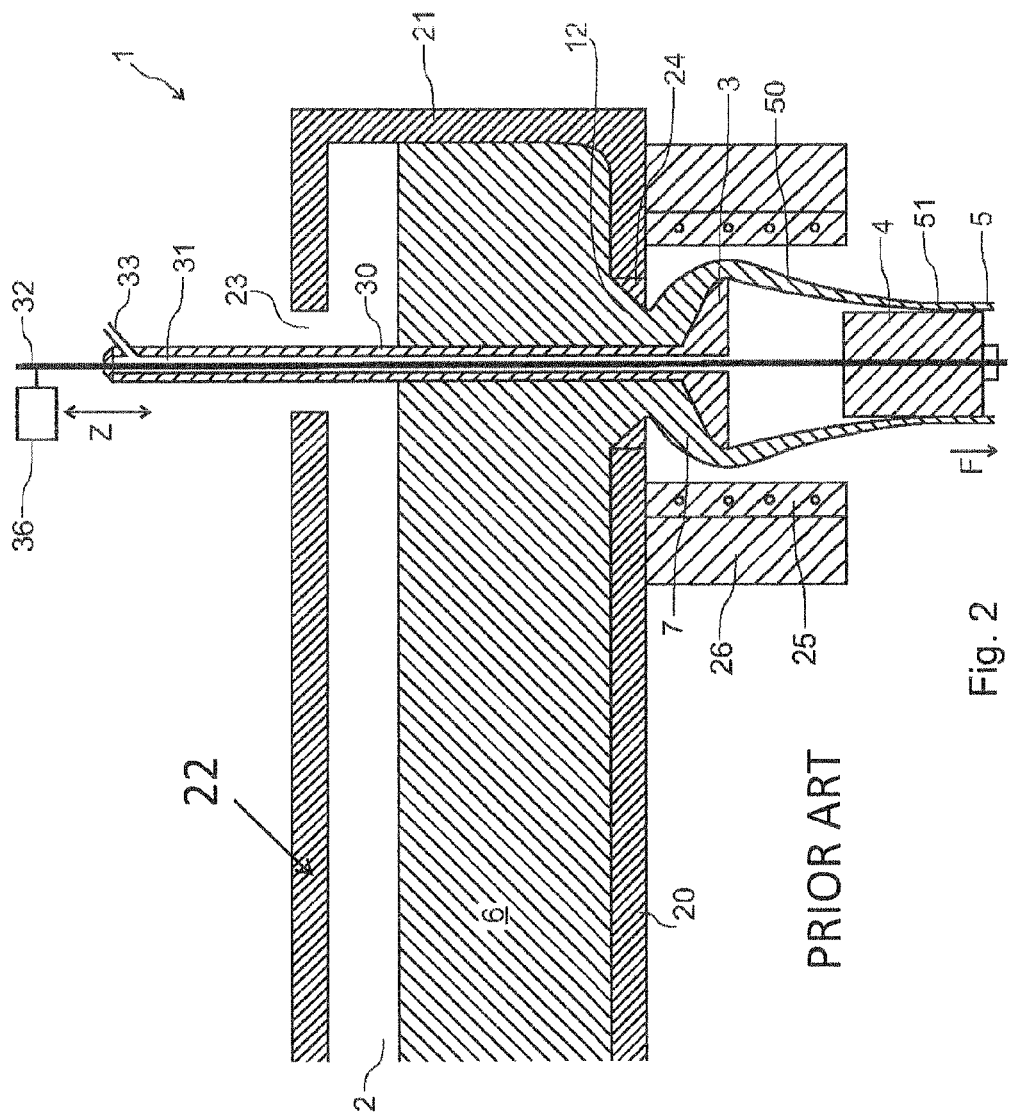
FIG. 2 is a schematic sectional view of an apparatus for manufacturing calibrated round or profiled glass tubes according to the present invention.

The apparatus 1 shown in FIG. 2 generally is of a similar configuration as the apparatus shown in FIGS. 1a and 1b. Nevertheless the detailed configuration and operation of this apparatus will be described hereinafter for easing an understanding of the present invention.

According to FIG. 2, the drawing device designated overall with reference numeral 1 comprises a melt channel 2 acting as a melt feed, which is formed by a bottom 20, a side wall 21 and an upper cover 22 to supply molten glass 6 therein. The melt channel 2 is supplied continuously or discontinuously by a melting furnace not shown and supplies suitably conditioned molten glass to the outlet opening 12. At the lower end of the melt channel 2 an outlet opening 12 for the molten glass 6 is defined by an outlet ring 24. According to FIG. 2, the outlet ring 24 tapers radially inwards so that the inner contour of the outlet ring 24 is defined by an edge. The outlet ring 24 can have a round profile or it can have a non-round profile, for example, a rectangular or elliptical profile.

According to FIG. 2, a conical shaping body 3 is arranged downstream from the outlet opening 12 of the melt channel 2, which is affixed at the lower end of a substantially tubular shaping body shaft 30 or unitarily formed therewith. As indicated by the double arrow Z, the shaping body shaft 30 can be moved vertically up and down to close the outlet opening of the outlet ring 24 or to adjust the width of the annular gap between the shaping body 3 and the outlet ring 24 to thereby adjust the throughput of molten glass. The shaft 30 is also adjustable in the horizontal (xy) direction and can thus be centred inside the outlet ring 24 so that the glass tube acquires a uniform wall thickness.

According to FIG. 2, the upper end of the shaping body shaft 30 projects beyond the upper cover so that an adjustment device (not shown) can cooperate with the upper end of the shaping body shaft 30 to suitably adjust the height position of the shaping body 3.

According to FIG. 2, a concentric profile forming body 4 is provided downstream, in the direction of gravity and the draw-off direction of the glass tube 5, said profile forming body being affixed exchangeably on the lower end of a shaft (rod) or of a cable 32. In FIG. 2, the profile forming body 4 is arranged at a distance from the lower end of the shaping body 3. By abutment of the lower portion of the hot but still deformable drawing bulb 50 to the profile forming body 4 in the region generally designated by reference numeral 50 the inner profile of the glass tube 5 can be adjusted (formed) precisely.

According to FIG. 2, an axial inner bore 31 is provided within the shaping body shaft 30 which receives the shaft of the profile forming body (hereinafter the rod) or of the cable 32. The inner bore 31 runs concentrically to the shaping body 3 and the profile forming body 4. The inner bore 31 is configured such that the rod or cable 32 is guided straight in the inner hole 31 and abuts circumferentially at least in sections on the inner circumferential surfaces of the inner bore 31 so that in every height position of the profile forming body 4, the shaping body 3 and the profile forming body 4 are arranged in alignment to one another, i.e., the profile forming body 4 is exclusively adjusted axially but not radially when changing the height position of the same.

The height position of the profile forming body 4 can be adjusted manually by an operator by axially displacing the rod or cable 32 within the inner bore 31. Of course, the mechanical or electric-motor-actuated adjusting device 36 shown in FIG. 2 can be provided for this purpose at the upper end of the inner bore 31 for axially displacing the rod or cable 32. The height adjusting device 36 is operated by an electronic control device (not shown) in a suitable manner. Mechanical displays or scales (not shown) are provided at the upper end of the drawing device 1 to indicate the height position of the shaping body 3 and of the profile forming body 4. Of course, the respective height position of the shaping body 3 and of the profile forming body 4 can also be detected by a detector, for example, an optical, inductive or capacitive scanning device, to be indicated on a display.

According to FIG. 2, a cylindrical heating device 25 and cylindrical thermal insulation 26 surrounding the cylindrical heating device 25 are provided at the lower end of the drawing device 1 in order to surround at least the shaping body 3 and preferably to surround both the shaping body 3 and at least the upper end of the profile forming body 4 to predetermine defined temperature conditions downstream of the outlet opening of the melt channel 2. Of course, for this purpose the heating device 25 can contain a plurality of independently operable heating zones in the longitudinal direction.

According to the present invention the profile forming body 4 is formed of a suitable refractory material which is also not wetted at high temperatures by the molten glass. Preferably, the profile forming body 4 according to the present invention is made of a polished graphite or of another non silica based material having a hexagonal crystal structure, e.g. of boron nitride. In order to avoid the formation of striations or corrugations on the inner surface of the glass tube 5, the bottom edge of the profile forming body 4 can be beveled or rounded. The profile forming body 3 according to the present invention can be made of a highly refractory material, which does not react with the molten glass 6 or only to a minor extent, e.g. of a noble metal such as platinum, or of an alloy of a noble metal such as a platinum alloy or of a steel resistant to high temperatures. As can be derived easily from FIG. 2, the profile forming body 3 may also be disposed within the melt channel 2 in order to close the annular gap between the shaping body 3 and the outlet ring 24 from above or to regulate it.

As will be apparent to the person skilled in the art, the profile forming body 4 can have an almost arbitrary outer profile so that various different glass tubes having corresponding round or non-round inner profiles can be manufactured according to the invention. Examples for such outer profiles can be derived from German patent DE 10 2004 018 148 B4 or corresponding US 2005/0227027 A1 of the applicant the whole content of which is hereby incorporated by reference.

Figure 4:
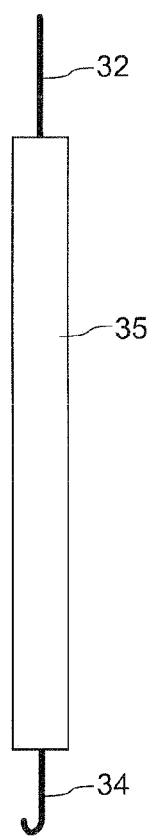
FIG. 4 is a schematic sectional view of a cable or rod with a weight used in the apparatus according to FIG. 2.

In certain cases, it is preferable according to the invention if the inner contour of the outlet ring 24, the outer contour of the shaping body 3 and the outer profile of the profile forming body 4 are constructed as corresponding to one another. Basically however, the outer profile of the profile forming body 4 can also differ from the outer contour of the shaping body 3. For example, the outer contour of the shaping body 3 can be circular whereas the outer profile of the profile forming body 4 is triangular, as shown in FIG. 4. However, in order to ensure uniform wall thickness of the glass tube 5 (FIG. 2), care must always be taken to ensure a concentric arrangement of shaping body 3 and profile forming body 4. In other words, the geometrical centre points of the shaping body 3 and profile forming body 4 are aligned according to the invention on a line running parallel to the drawing direction of the molten glass or the glass tube 5 so that symmetrical conditions can be achieved downstream of the outlet opening of the melt channel 2.

The following process is adopted to draw a calibrated round or profiled glass tube: the melt feed or melt channel 2 supplies suitably conditioned molten glass 6. By varying the height position of the shaping body 3, the annular gap between the shaping body 3 and the outlet ring 24 is suitably adjusted so that a sufficient drawing speed and a sufficient wall thickness of the glass tube 5 can be achieved with a drawing force F. The profile forming body 4 is arranged at a suitable distance from the front end of the shaping body 3 so that the molten glass 7 emerging or drawn from the outlet opening 12 forms a hollow drawing bulb 50 downstream of the shaping body 3, whose inner circumferential surfaces contact the lower portion of the profile forming body 4, as shown in FIG. 2. The drawing bulb 50 is in any case still sufficiently soft and deformable at the upper end of the contact region 51 on the profile forming body 4.

As the glass tube 5 is drawn further, the drawing bulb 50 becomes constricted until finally at the lower end of the profile forming body 4, inner circumferential surfaces of the drawing bulb 50 come to contact the outer surfaces of the profile forming body 4. The contact region 51 thus formed, having a constant outer profile, preferably does not extend over the total length of the profile forming body 4 but only over a certain length on the lower partial portion of the same. The inner profile of the glass tube 5 is determined by the contact of the inner circumferential surfaces of the drawing bulb 50 on the outer surfaces of the profile forming body 4. During further drawing the outer walls of the glass tube 5 can be stretched slightly further downstream of the profile forming body 4 until the temperature of the glass tube 5 has dropped to a temperature below the softening point. The temperature conditions downstream of the outlet opening of the melt channel 2 can be additionally controlled by means of the heating device 25.

For varying the characteristics of the glass tube 5, in particular the geometry thereof, in the method according to the present invention in particular the following parameters are available, which can be varied easily either individually or in a coordinated manner: the temperature of the molten glass 6 in the melt channel 2 or at the outlet orifice 12 thereof; the inner diameter of the outlet orifice 12 and the outer diameter of the shaping body 3; the width of the annular gap between the shaping body 3 and the outlet ring 24; the outer diameter and the outer profile of the profile forming body 4; the heating power of the heating device 25; the length of the profile forming body 4; the distance between the lower end of the shaping body 3 and the upper end of the profile forming body 4 and the throughput of molten glass.

According to the present invention the temperature conditions are set such that the viscosity of the molten glass in the region of the shaping body 3 is approximately in the range between ca. $2 \times 10^4$ to $10^6$ dPas and that the viscosity of the molten glass at the lower end of the profile forming body 4 is approximately $10^6$ dPas and is at least lower than the viscosity at the Littleton-point of the glass. Thus, the temperature of glass falls below the temperature of the softening point of the glass just downstream from the profile forming body 4. For this purpose cooling devices (not shown) may be provided downstream from the profile forming body 4.

As can be easily concluded from FIG. 2, the wall thickness of the glass tube at a given annular gap is substantially given by the throughput, the temperature and the drawing speed. In certain cases a slight additional forming of the glass tube may occur downstream from the profile forming body 4. These conditions can be adjusted easily, in particular by means of the temperature and the drawing force, so that the inner profile and outer profile that is finally accomplished can be set with a high precision. Preferably, however, the temperature conditions and the position of the profile forming body 4 are selected such that no additional forming of the glass tube occurs downstream from the profile forming body.

In order to replace the profile forming body 4 by a profile forming body having a different outer profile, a procedure as outlined below with reference to FIGS. 3a to 3d is performed. For the sake of keeping the drawings simple, FIGS. 3a to 3d only show the profile forming body 3 together with the glass tube 5', which is being drawn, whereas further details of the drawing device are substantially omitted.

Figure 3:
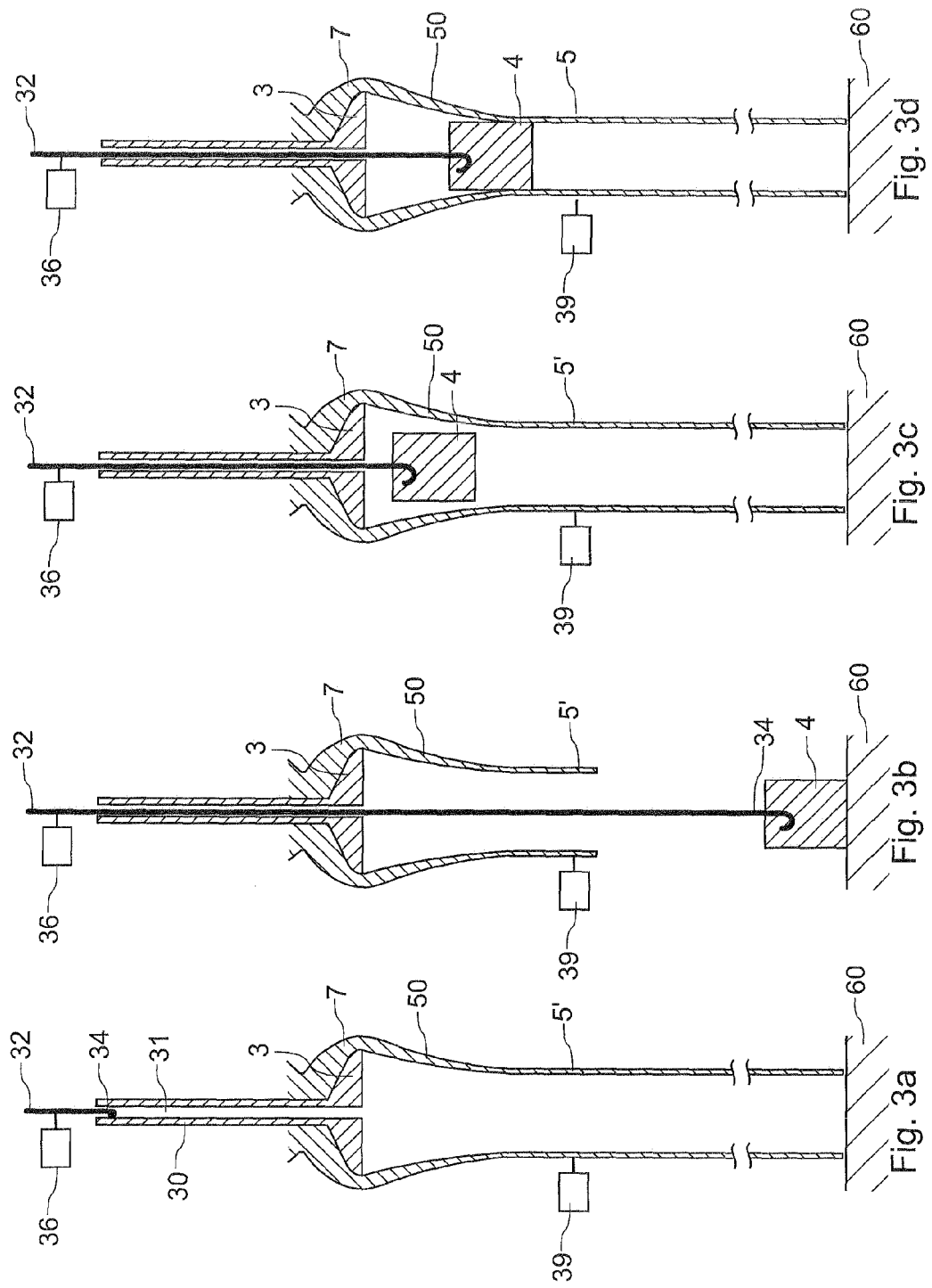
FIGS. 3a to 3d show the procedure for replacing the profile forming body in an apparatus according to FIG. 2 the details of which have been omitted.

For the purpose of describing this procedure, at first it is assumed that the profile forming body shall be arranged only once at the desired operation position. FIG. 3a shows how a glass tube 5' is formed (or freely drawn) according to the known Vello-method or Down-Draw-method without using a profile forming body downstream from the shaping body 3. By a suitable adjustment of the drawing speed and the opening width of the outlet orifice 12 (cf. FIG. 2) the drawing bulb 50 is freely drawn to a glass tube 5'. The hatched region in FIG. 3a indicates a bottom floor or the like below the drawing device so that in FIGS. 3a to 3d a Down-Draw-method is considered. Shortly before the front end of the moving glass tube 5', which is freely drawn, reaches the bottom floor, a cutting device 39 is used to cut a glass tube 5' from the subsequent glass tubing in a region below the drawing bulb 50, where the glass tube 5' has sufficiently cooled down, and is then conveyed by means of a conveying device (not shown). Furthermore, the glass tube 5' is drawn continuously via the shaping body 3.

For positioning the profile forming body, firstly according to FIG. 3a a rod or cable 32 is lowered via the inner bore 31 of the shaft 30 supporting the shaping body 3 by means of the height adjusting device 36, until the front end thereof, which is provided with a hook 34, has reached the profile forming body, which according to FIG. 3b is positioned on the bottom floor and at a central position relative to the inner space of the glass tube 5'. In this position the profile forming body 4 is coupled to the rod or cable 32 by means of the hook 34 or another suitable fixing means (not shown). As can be concluded from FIG. 3b, the rod or cable 32 extends through the entire inner space of the drawing bulb 50 and of the glass tube 5' and protrudes beyond the front end of the glass tube 5' up to the profile forming body 4. The distance between the shaping body 3 and the hatched bottom floor may be several meters, such as twelve meters, so that at typical drawing rates of the freely drawn glass tube 5' of several centimeters per second there remains sufficient time for the suitable positioning of the profile forming body 4 and for connecting the profile forming body 4 with the rod or cable 32, namely in a region which is at an adequate distance to the front end of the glass tube 5', which is still hot and moves downward.

As can be concluded from FIG. 3c, afterwards the rod or cable 32 is again raised by means of the height adjusting device 36 in order to insert the profile forming body 4 into the inner space of the freely drawn glass tube 5', which moves downward, namely up to the region of the drawing bulb 50 until the desired operational position is reached at a distance between the shaping body 3 and the profile forming body 4, which is in accordance with the respective process parameters. If a cable 32 is used for lifting the profile forming body 4, this cable is then coupled with a rod of sufficient mechanical stability in the desired operational position, e.g. by changing the coupling of the profile forming body 4 so that it is held mechanical stable enough during the subsequent manufacturing process.

As can be concluded from FIG. 3c, the maximum outer dimensions of the profile forming body 4, e.g. assuming a circular outer profile the outer diameter thereof, is smaller than a corresponding minimum inner dimension of the freely drawn glass tube 5', e.g. the opening width of the glass tube 5'. This is accomplished by means of an adequate adjustment of the process parameters for freely drawing the glass tube 5', in particular by means of a suitable drawing rate of the glass tube 5', the opening width of the outlet orifice 12 of the melt channel 2 (cf. FIG. 2), the temperature in the region of the heating muffle 25, 26 (cf. FIG. 2) just downstream from the outlet orifice 12. In addition or as an alternative a negative pressure generating means may be provided in the region of the heating muffle 25, 26 for generating a negative pressure from outside onto the drawing bulb in this region in order to suitably widening the drawing bulb 50 and hence also the glass tube 5.

Finally, after reaching the desired operational position according to FIG. 3d the process parameters are set such that the inner surface of the drawing bulb 50 comes into contact with the outer surface of the profile forming body 4 so that the inner profile of the glass tube 5 thus formed exactly corresponds to the outer profile of the profile forming body 4. The further process is in accordance with the procedure outlined in German patent DE 10 2004 018 148 B4 or corresponding US 2005/0227027 A1 of the applicant, the whole content of which is hereby explicitly incorporated by reference.

Immediately before the front end of the glass tube 5 having the predetermined inner profile reaches the hatched bottom floor, again a glass tube 5 is cut by means of the cutting device 39 and is then conveyed laterally.

For replacing a profile forming body 4 presently used by a different or new profile forming body, the same procedure is followed according to the present invention. For this purpose, firstly the profile forming body 4 is lowered from the region of the drawing bulb 50 via the inner space of the glass tube 5 by actuating the height adjusting device 36 until finally the bottom floor is nearly reached. In this position the profile forming body 4 has left the inner space of the glass tube 5 completely so that full access is enabled to the inner space of the glass tube 5 so that the profile forming body 4 can be easily separated from the rod or the cable 32 and replaced. For this purpose the glass tube 5, which is moving downward, is cut in a suitable manner. Afterwards, the new profile forming body 4 is again inserted into the inner space of the glass tube 5 and of the drawing bulb 50, as outlined above with reference to FIGS. 3a to 3d. For this purpose, the glass tube 5 may be widened up to an adequate extent, namely until the minimum inner dimension (the opening width) of the glass tube 5 is larger than the maximum outer dimension of the profile forming body 4. For this purpose the process parameters prevailing may be varied in a suitable manner as outlined above and/or an adequate negative pressure may be applied in the region of the drawing bulb 50, as outlined above.

FIG. 4 shows the lower end of the rod or cable 32 according to a further embodiment, where a weight 35 having a smaller maximum outer dimension than the profile forming body to be fixed to the hook or coupling portion 34 is provided above the hook or coupling portion 34. This weight 35 serves to exert an additional load to the rod or cable 32 and thus further enhances the mechanical stability and equilibrium state of the pendulum-like system. Of course, the weight 35 may also be omitted or removed, e.g. when finally a profile forming body 4 having an adequate weight is fixed to the hook or coupling portion 34.

Figure 5:
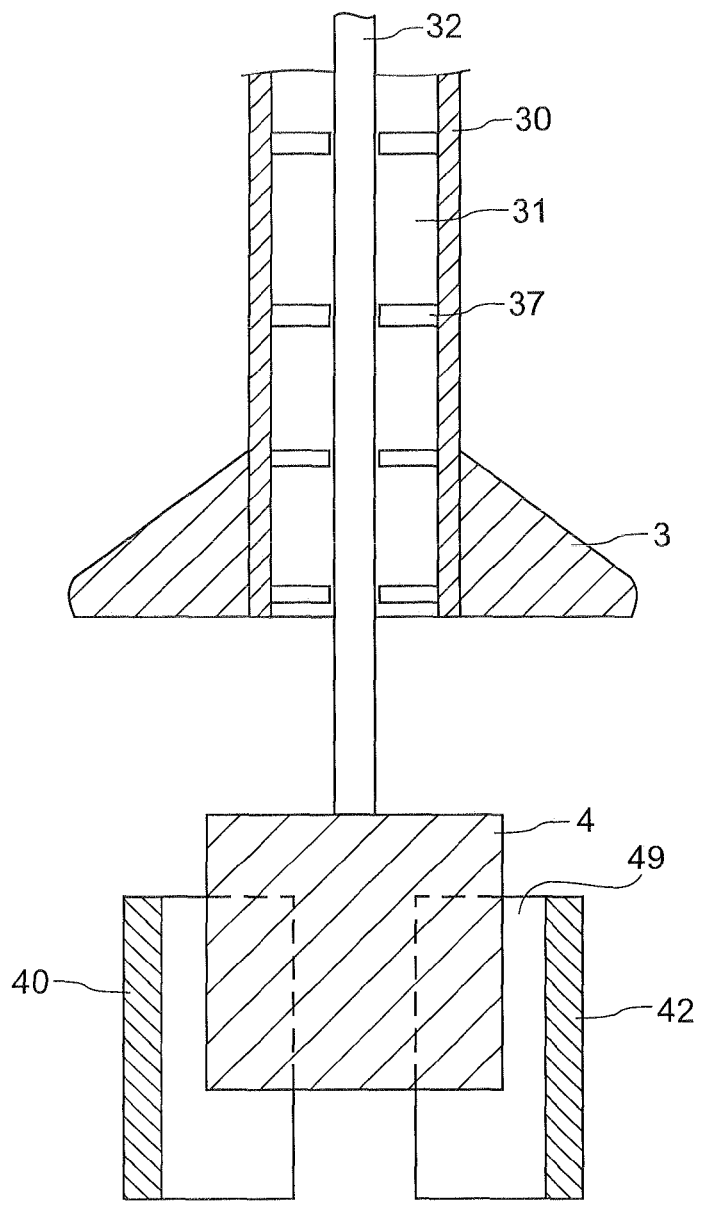
FIG. 5 shows the near vicinity of the shaping body and the downstream profile forming body of another embodiment of the apparatus according to FIG. 2 in a sectional view.
Figure 6:
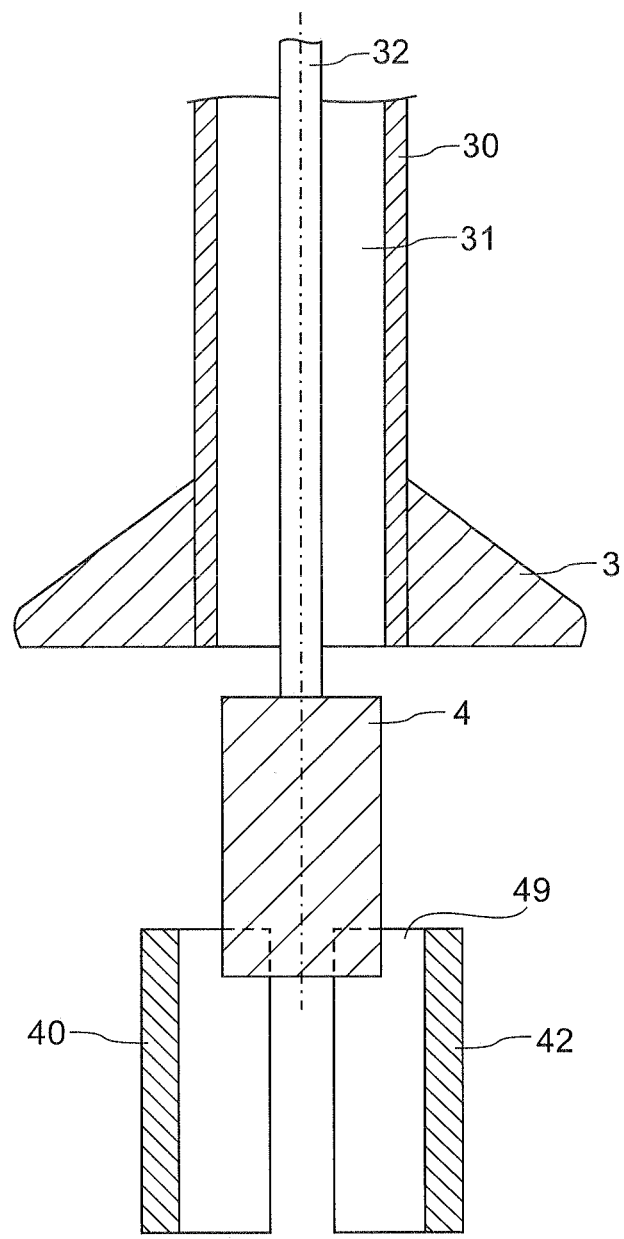
FIG. 6 shows the near vicinity of the shaping body and the downstream profile forming body of another embodiment of the apparatus according to FIG. 2 in a sectional view.

With reference to FIGS. 5 and 6 in the following further details of the shaping body and of the positioning of the profile forming body shall be described. For centering and straightly guiding the rod or cable 32, according to FIG. 5 a plurality of guiding members 37 are disposed within the inner bore 31 of the shaft 30 supporting the shaping body 3, wherein the guiding members 37 are spaced apart from each other and are provided with an inner bore which corresponding to the profile of the rod or cable 32 so that the rod or cable 32 is guided by the plurality of guiding members along a straight line, i.e. substantially only in axial direction, but not in a direction perpendicular to the longitudinal direction of the shaft 30. The bores are aligned and disposed concentrically along the central axis of the shaft 30 and the inner bore 31 so that a centering of the rod or cable 32 and of the profile forming body 4, coupled with the rod or cable 32, is thereby accomplished. Because of the relatively small distance between the shaping body 3 and the profile forming body 4 in the operational position as compared to the overall length of the shaft 30, even this centering may already be sufficient to accomplish an adequately stable mechanical positioning of the profile forming body 4 so that a lateral play or jittering of the profile forming body 4 in the operational position may be substantially prevented. For this purpose preferably a high inherent rigidity of the rod or cable 32 may contribute, in particular if no cable is used but instead a metal rod 32, which is mechanically stable.

Nevertheless, a certain jittering of the profile forming body 4 in a direction perpendicular to the drawing direction of the glass tube may occur. In order to suppress or prevent such an undesired lateral jittering of the profile forming body 4, according to FIG. 5 two counter members 40, 42 are disposed spaced apart to the profile forming body 4 and forming an annular gap 49.

The two counter members 40, 42 surround the profile forming body 4 just like a semi-shell and respectively have an inner profile corresponding to the outer profile of the profile forming body 4 so that the width of the gap 49 in the region between the counter members 40, 42 and the profile forming body 4 positioned centrally therebetween is constant and corresponds to the wall thickness of the glass tube to be manufactured. Due to the cooperation between the profile forming body 4 and the two counter members 40, 42 thus also the outer profile of the glass tube is adjusted at low tolerances. Overall, according to the present invention a calibrated glass tube having a predetermined inner profile and outer profile is provided in this manner with low tolerances.

Of course, the counter members 40, 42 or also additional counter members can substantially encase the profile forming body 4 in order to form a substantially fully encased annular gap 49. As shown in FIG. 5, the counter members 40, 42 are disposed downstream from the profile forming body, if viewed in the direction of drawing the glass tube, so that the drawing bulb firstly comes in contact with the upper portion of the profile forming body 4 and enters the annular gap 49 between the profile forming body 4 and the two counter members 40, 42 only later.

As will become apparent to a person skilled in the art, in cooperation with the counter members 40, 42, which are preferably positioned concentrically or symmetrical with respect to the central axis of the shaft 30, the positioning of the profile forming body 4 is stabilised against a lateral jittering thereof.

FIG. 6 shows a further embodiment, wherein the profile forming body 4 has a smaller maximum outer dimension that the minimum inner dimension of the inner bore 31 of the shaft 30 supporting the shaping body 3. Thus, the profile forming body 4 may be lowered via the inner bore 31 to the region of the drawing bulb (not shown) in order to be positioned in the desired operational position. Also in the embodiment of FIG. 6 counter members 40, 42 are disposed around the profile forming body 4 for forming or shaping the outer profile of the glass tube.

As will become apparent to the person skilled in the art when studying the above description, also the counter members 40, 42 are formed of a suitable refractory material which is not wetted by the molten glass even at high temperatures. Preferably, such counter members according to the present invention consist of a polished graphite or of another non silica based material having a hexagonal crystal structure, e.g. of boron nitride. In order to avoid the formation of striations or corrugations on the inner surface of the glass tube, also the bottom edges of the counter members can be beveled or rounded. Furthermore, also the annular gap 49 (cf. FIG. 5) between the profile forming body 4 and the counter members 40, 42, if viewed in the direction of drawing-off the glass tube, may be tapered at least partially in order to enable a constant and smooth entering of the drawing bulb into the region of the annular gap 49. As will become apparent from the above description, the afore-mentioned process of positioning and/or replacing the profile forming body is particularly preferred in a down-draw-method for manufacturing glass tubes.

LIST OF REFERENCE NUMERALS 1 drawing device
2 melt supply/melt channel
3 shaping body/drawing needle
4 profile forming body
5 profiled or calibrated glass tube
5' freely drawn glass tube
6 glass melt
7 emerging glass melt
12 outlet orifice
20 bottom wall
21 side wall
22 upper cover
23 orifice
24 outlet ring
25 heating device
26 heat insulation
30 shaft of shaping body
31 inner bore
32 drawing rod/cable
33 inlet for process gas and/or inert protective gas
34 hook/coupling device
35 weight
36 height adjusting device
37 guiding member
39 cutting device
40 first counter member
42 second counter member
50 drawing bulb
51 contact region
60 bottom floor
F drawing force
Z longitudinal adjustment of the profile forming body Reference Numerals Relating to Prior Art
100 drawing device
102 melt supply/melt channel
103 shaping body/drawing needle
104 profile forming body
105 profiled or calibrated glass tube
106 glass melt
107 emerging glass melt
112 outlet orifice
120 bottom wall
121 side wall
122 upper cover
123 orifice
124 outlet ring
125 heating device
126 heat insulation
130 shaft of shaping body
131 inner bore
132 drawing rod/cable
133 inlet for process gas and/or inert protective gas
150 drawing bulb

What is claimed is:

1. A method for manufacturing glass tubes having a predetermined inner profile, in which method:
molten glass emerges from an outlet orifice of a melt feed and is drawn over a shaping body so as to form a hollow drawing bulb, and
the drawing bulb is drawn over a profile forming body positioned downstream of the shaping body so that an inner circumferential surface of the drawing bulb is deformed while abutting against an outer surface of the profile forming body to form a glass tube having the predetermined inner profile, and in which method
said glass tube is severed in a region below the drawing bulb to provide a region with free access below said shaping body and said profile forming body is moved in an axial direction from below the shaping body via an inner space of the glass tube or
said profile forming body is inserted in an inner bore of a shaft supporting said shaping body from above and moved in the axial direction via said inner bore
until reaching an operational position in the inner space of said glass tube for positioning said profile forming body in said operational position for the first time or after replacement of a profile forming body previously used in said method.

2. The method according to claim 1, wherein the molten glass is drawn continuously from the outlet orifice while said profile forming body is moved in said axial direction from below the shaping body via the inner space of the glass tube or said profile forming body is inserted in said inner bore of the shaft from above and moved in the axial direction until reaching said operational position.

3. The method according claim 1, wherein said glass tube and/or said drawing bulb is widened until a minimum inner dimension of the glass tube transverse to a direction of drawing the glass tube is larger than a maximum outer dimension of said profile forming body, before said profile forming body is moved into the inner space of the glass tube in the axial direction.

4. The method according to claim 3, wherein a negative pressure is generated in the vicinity of said drawing bulb from an outer side thereof while said glass tube is widened.

5. The method according to claim 4, wherein the negative pressure is applied within a heating muffle which is disposed directly downstream from said outlet orifice and surrounds said drawing bulb.

6. The method according to claim 1, wherein the profile forming body is positioned in said region below said shaping body with free access and coupled to a rod or cable so that said profile forming body is subsequently inserted into the inner space of the glass tube and moved to said operational position.

7. The method according to claim 6, wherein said rod or cable is lowered via said inner bore of said shaft and via said drawing bulb towards said profile forming body to raise said profile forming body towards said operational position, or wherein said rod or cable raises said profile forming body from below the shaping body into the inner space of the glass tube until reaching said operational position.

8. The method according to claim 6, wherein said profile forming body is releasably coupled with the rod or cable and/or is supported or guided in a rotationally fixed manner relative to said shaping body and the outlet orifice, when said profile forming body is held in said operational position or guided towards said operational position.

9. The method according to claim 1, wherein the rod or cable is lowered via said inner bore of said shaft and via said drawing bulb together with said profile forming body until reaching said operational position.

10. The method according to claim 1, wherein at least two counter members are positioned spaced apart from and around said profile forming body to form a gap in said operational position for forming the outer profile of said glass tube.

11. The method according to claim 1, wherein the glass tube is drawn from the molten glass using a Vella-method or Down-Draw-method.

12. An apparatus for manufacturing glass tubes having a predetermined inner profile, comprising a melt feed with an outlet orifice for molten glass, a shaping body, a profile forming body downstream of said shaping body and a severing device for severing a glass tube, wherein
a drawing device is provided to draw the molten glass from the outlet orifice and over said shaping body to form a drawing bulb, wherein said profile forming body is arranged downstream of the shaping body so that an inner circumferential surface of the drawing bulb is deformed while abutting against an outer surface of the profile forming body to form said glass tube with the predetermined inner profile corresponding to the profile of said outer surface, and
said severing device is configured for severing said glass tube in a region below said shaping body,
said apparatus further comprising means for controlling a profile forming process such that said glass tube is severed in a region below the drawing bulb to provide a region with free access below said shaping body and said profile forming body is moved in an axial direction from below the shaping body via an inner space of the glass tube or said profile forming body is inserted in an inner bore of a shaft supporting said shaping body from above and moved in an axial direction from below said shaping body in said inner bore
until reaching an operational position in the inner space of said glass tube for positioning said profile forming body in said operational position for the first time or after replacement of a profile forming body previously used in said profile forming process.

13. In a method for manufacturing glass tubes having a predetermined inner profile, wherein molten glass emerges from an outlet orifice of a melt feed and is drawn over a shaping body so as to form a hollow drawing bulb, and the drawing bulb is drawn over a profile forming body positioned downstream of the shaping body so that an inner circumferential surface of the drawing bulb is deformed while abutting against an outer surface of the profile forming body to form the predetermined inner profile corresponding to the profile of said outer surface, positioning said profile forming body in an operational position in an inner space of said glass tube for the first time or after replacement of a profile forming body previously used in said method by serving said glass tube in a region below the drawing bulb to provide a region with free access below said shaping body and moving said profile forming body in an axial direction from below the shaping body via the inner space of the glass tube or inserting said profile forming body in an inner bore of a shaft supporting said shaping body from above and moving said profile forming body in an axial direction via said inner bore until reaching said operational position in the inner space of said glass tube.

\* \* \* \* \*

UNITED STATES PATENT AND TRADEMARK OFFICE
CERTIFICATE OF CORRECTION

| | | |
|---|---|---|
| PATENT NO. | : 8,726,694 B2 | Page 1 of 1 |
| APPLICATION NO. | : 13/551920 | |
| DATED | : May 20, 2014 | |
| INVENTOR(S) | : Ziegler et al. | |

It is certified that error appears in the above-identified patent and that said Letters Patent is hereby corrected as shown below:

In the Claims

Claim 9, Column 14, Line 19, delete "Claim 1" and substitute 'Claim 6'.

Claim 13, Column 15, Line 7, delete "serving" and substitute 'severing'.

Signed and Sealed this
Sixteenth Day of December, 2014

Michelle K. Lee
*Deputy Director of the United States Patent and Trademark Office*